United States Patent
Kim et al.

(10) Patent No.: US 10,169,679 B1
(45) Date of Patent: Jan. 1, 2019

(54) LEARNING METHOD AND LEARNING DEVICE FOR ADJUSTING PARAMETERS OF CNN BY USING LOSS AUGMENTATION AND TESTING METHOD AND TESTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: STRADVISION, INC., Gyeongsangbuk-Do (KR)

( * ) Notice: Subject to any disclaimer, the term of this patent is extended or adjusted under 35 U.S.C. 154(b) by 0 days.

(21) Appl. No.: 15/783,481

(22) Filed: Oct. 13, 2017

(51) Int. Cl.
*G06K 9/00* (2006.01)
*G06K 9/62* (2006.01)
*G06K 9/48* (2006.01)
*G06N 3/08* (2006.01)
*G06K 9/20* (2006.01)
*G06N 3/04* (2006.01)

(52) U.S. Cl.
CPC ........ *G06K 9/6256* (2013.01); *G06K 9/2054* (2013.01); *G06K 9/481* (2013.01); *G06K 9/6202* (2013.01); *G06N 3/04* (2013.01); *G06N 3/084* (2013.01)

(58) Field of Classification Search
CPC ............................. G06N 3/084; G06K 9/2054
See application file for complete search history.

(56) References Cited

U.S. PATENT DOCUMENTS

| | | | |
|---|---|---|---|
| 2017/0011281 A1* | 1/2017 | Dijkman | G06K 9/66 |
| 2017/0147905 A1* | 5/2017 | Huang | G06K 9/6232 |
| 2017/0206431 A1* | 7/2017 | Sun | G06N 3/084 |
| 2017/0262996 A1* | 9/2017 | Jain | G06T 7/0087 |
| 2017/0308770 A1* | 10/2017 | Jetley | G06K 9/6256 |
| 2018/0114055 A1* | 4/2018 | Wang | G06K 9/00268 |
| 2018/0137642 A1* | 5/2018 | Malisiewicz | G06T 7/70 |

* cited by examiner

*Primary Examiner* — Oneal R Mistry
(74) *Attorney, Agent, or Firm* — XSENSUS LLP (57) ABSTRACT

A learning method for adjusting parameters of a CNN using loss augmentation is provided. The method includes steps of: a learning device acquiring (a) a feature map from a training image; (b) (i) proposal ROIs corresponding to an object using an RPN, and a first pooled feature map by pooling areas, on the feature map, corresponding to the proposal ROIs, and (ii) a GT ROI, on the training image, corresponding to the object, and a second pooled feature map by pooling an area, on the feature map, corresponding to the GT ROI; and (c) (i) information on pixel data of a first bounding box when the first and second pooled feature maps are inputted into an FC layer, (ii) comparative data between the information on the pixel data of the first bounding box and a GT bounding box, and backpropagating information on the comparative data to adjust the parameters.

24 Claims, 8 Drawing Sheets

LEARNING METHOD AND LEARNING DEVICE FOR ADJUSTING PARAMETERS OF CNN BY USING LOSS AUGMENTATION AND TESTING METHOD AND TESTING DEVICE USING THE SAME

FIELD OF THE INVENTION

The present invention relates to a learning method and a learning device for adjusting parameters of a CNN by using loss augmentation and a testing method and a testing device using the same; and more particularly, to the method of (a) acquiring at least one feature map from a training image, (b) acquiring one or more proposal ROIs corresponding to at least one object on the training image by using an RPN and creating at least one first pooled feature map by applying pooling operation to areas, on the feature map, corresponding to the proposal ROIs, (c) acquiring a GT ROI, on the training image, corresponding to the object and creating a second pooled feature map by applying pooling operation to an area, on the feature map, corresponding to the GT ROI, (d) acquiring information on pixel data of a first bounding box by regression when the first pooled feature map and the second pooled feature map are inputted into a first FC layer, (e) acquiring a first comparative data by a comparison between the information on the pixel data of the first bounding box and information on pixel data of a GT bounding box, and (f) backpropagating information on the first comparative data to thereby perform a first adjustment of at least part of the parameters.

BACKGROUND OF THE INVENTION

In machine learning, a convolutional neural network (CNN, or ConvNet) is a class of deep, feed-forward artificial neural network that has successfully been applied to analyzing visual imagery.

Figure 1:
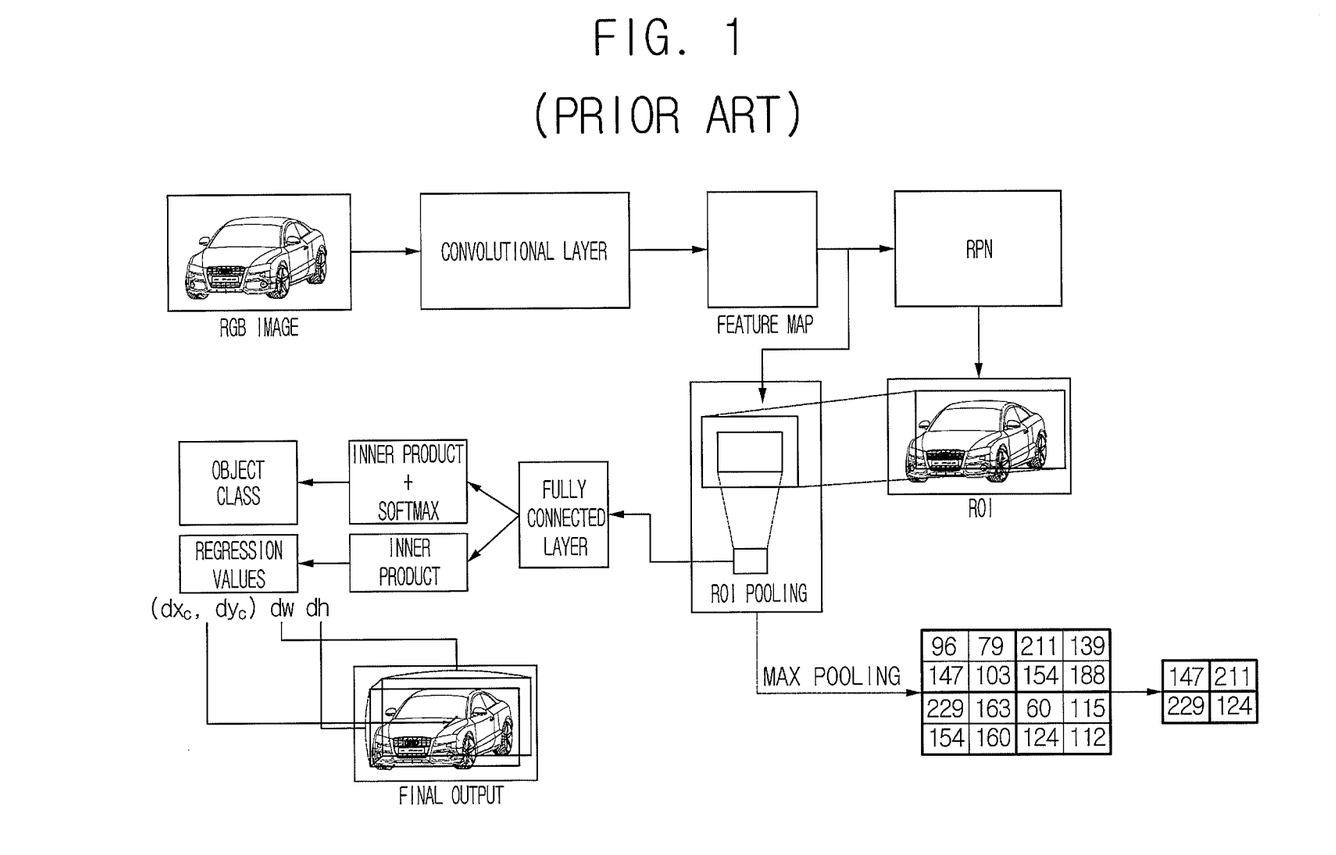
FIG. 1 is a diagram schematically illustrating a process of conventional learning device which acquires a bounding box and compares it with a GT bounding box.

FIG. 1 is a diagram schematically illustrating a learning process using a conventional CNN, which compares a predicted bounding box with a ground truth (GT) bounding box to thereby acquire loss values. For example, the loss values may include $dx_c$, $dy_c$, $dw$, and $dh$ as shown in FIG. 1.

First, a convolutional layer, which includes at least one convolutional filter, of the conventional learning device as illustrated in FIG. 1 may receive a training image, e.g., an RGB image, of an object and then create at least one feature map by using the training image. A width and a height of the feature map may decrease as it passes through the convolutional layer, but the number of channels thereof may increase.

Next, when the feature map is inputted into a region proposal network (RPN), the conventional learning device may allow the RPN to acquire at least one region of interest (ROI). In detail, if the feature map is inputted into the RPN, the RPN may create one or more anchor boxes and determine specific anchor boxes which matches the GT bounding box with a degree of being equal to or greater than a predetermined threshold among the anchor boxes as the ROI by comparing each of the anchor boxes with the GT bounding box.

Then, the conventional learning device may allow a pooling layer to apply either max pooling or average pooling operation to pixel data, corresponding to the ROI, on the feature map. Herein, the max pooling may partition the feature map into a set of non-overlapping sub-regions and, for each of the sub-regions, output its corresponding maximum value among values of pixels in each of the sub-regions, and the average pooling may partition the feature map into a set of non-overlapping sub-regions and, for each of the sub-regions, output its corresponding average value.

Next, the conventional learning device in FIG. 1 may perform processes of (i) inputting a pooled feature map, acquired as a result of the max pooling or the average pooling, into a fully connected (FC) layer and (ii) allowing the FC layer to confirm a type, i.e., a class, of the object by applying classification operations to the pooled feature map. For reference, the pooled feature map may be called as a feature vector.

Further, the conventional learning device in FIG. 1 may allow the FC layer to acquire a bounding box on the training image, and then allow a loss layer to acquire loss values which represent difference between the acquired bounding box and the GT bounding box. Herein, the GT bounding box may be a bounding box including exactly the object in the training image and may be created by a human in general.

Finally, the conventional learning device in FIG. 1 may adjust at least part of one or more parameters of the FC layer, one or more parameters of the RPN, and one or more parameters of the convolutional layer to reduce the loss values during a backpropagation process. By adjusting the parameters, an accuracy of acquiring the bounding box in a test image later may be improved.

Conventionally, the pooling layer may apply pooling operations to an area, corresponding to the ROI determined by the RPN, on the feature map. However, because the ROI may not include the object exactly, the features pooled from this area may not be the desired features of the object. Therefore, such pooled features may have a bad influence on learning of the CNN.

Consequently, the inventor of the present invention proposes a technique that utilizes additional GT ROI beside the conventional ROI in learning.

SUMMARY OF THE INVENTION

It is an object of the present invention to solve all the aforementioned problems.

It is another object of the present invention to (i) concatenate (i-1) a pooled feature map acquired by applying pooling operation to an area, on the feature map, corresponding to the ROIs acquired using the RPN and (i-2) a pooled feature map acquired by applying pooling operation to an area, on the feature map, corresponding to the GT ROI, (ii) input the concatenated pooled feature map into a FC layer to acquire the bounding box by the regression, (iii) backpropagate information on a loss acquired by comparison between the acquired bounding box and the GT bounding box to thereby adjust the parameters, and (iv) support another device to acquire a bounding box, on the test image, including the object more accurately by using the adjusted parameters.

In accordance with one aspect of the present invention, there is provided a learning method for adjusting one or more parameters of a convolutional neural network (CNN) by using loss augmentation, including steps of: (a) a learning device acquiring or supporting another device to acquire at least one feature map from a training image; (b) the learning device performing or supporting another device to perform (i) a process of acquiring one or more proposal ROIs corresponding to at least one object on the training image by using an RPN and a process of creating at least one first pooled feature map by applying pooling operation to areas, on the feature map, corresponding to the proposal ROIs, and (ii) a process of acquiring a GT ROI, on the training image, corresponding to the object and a process of creating a second pooled feature map by applying pooling operation to an area, on the feature map, corresponding to the GT ROI; and (c) the learning device performing or supporting another device to perform (i) a process of acquiring information on pixel data of a first bounding box by regression when the first pooled feature map and the second pooled feature map are inputted into a first FC layer, (ii) a process of acquiring a first comparative data by a comparison between the information on the pixel data of the first bounding box and information on pixel data of a GT bounding box, and (iii) a process of backpropagating information on the first comparative data to thereby perform a first adjustment of at least part of the parameters.

In accordance with another aspect of the present invention, there is provided a method of acquiring a bounding box for testing of an object for testing on a test image by using a testing device including a convolutional neural network (CNN), including steps of: (a) the testing device, on condition that a learning device including the CNN performs or supports another device to perform (1) a process of acquiring a feature map for training from a training image, (2) (i) (i-1) a process of acquiring one or more proposal ROIs for training, on the training image, corresponding to at least one object for training by using an RPN and (i-2) a process of creating at least one first pooled feature map by applying pooling operation to areas, on the feature map for training, corresponding to the proposal ROIs for training, and (ii) (ii-1) a process of acquiring a GT ROI, on the training image, corresponding to the object for training and (ii-2) a process of creating a second pooled feature map by applying pooling operation to an area, on the feature map for training, corresponding to the GT ROI; (3) (i) (i-1) a process of acquiring information on pixel data of a first bounding box for training by regression when the first pooled feature map and the second pooled feature map are inputted into a first FC layer, (i-2) a process of acquiring a first comparative data by a comparison between the information on the pixel data of the first bounding box for training and information on pixel data of a GT bounding box for training, (i-3) a process of backpropagating information on the first comparative data to thereby perform a first adjustment of at least part of the parameters of the CNN; and (ii) (ii-1) a process of acquiring information on pixel data of a second bounding box for training by the regression when the first pooled feature map is inputted into a second FC layer, (ii-2) a process of acquiring a second comparative data by a comparison between the information on the pixel data of the second bounding box for training and the information on the pixel data of the GT bounding box for training, and (ii-3) a process of backpropagating information on the second comparative data to thereby perform a second adjustment of at least part of the parameters of the CNN, acquiring or supporting another device to acquire the test image and then a feature map for testing therefrom by using the CNN with the parameters having been adjusted by the learning device performing the first and the second adjustments; (b) the testing device acquiring or supporting another device to acquire one or more proposal ROIs for testing, corresponding to the object for testing, on the test image by using the RPN; (c) the testing device creating or supporting another device to create at least one pooled feature map for testing by applying pooling operation to areas, on the feature map for testing, corresponding to the proposal ROIs for testing; and (d) the testing device acquiring or supporting another device to acquire a bounding box for testing by regression when the pooled feature map for testing is inputted into the second FC layer.

In accordance with still another aspect of the present invention, there is provided a learning device for adjusting one or more parameters of a convolutional neural network (CNN) by using loss augmentation, including: a communication part for acquiring or supporting another device to acquire a training image or its corresponding at least one feature map; and a processor for performing or supporting another device to perform (i) a process of acquiring one or more proposal ROIs corresponding to at least one object on the training image by using an RPN and a process of creating at least one first pooled feature map by applying pooling operation to areas, on the feature map acquired from the communication part or the feature map calculated by applying one or more convolution operations to the training image acquired from the communication part, corresponding to the proposal ROIs; (ii) a process of acquiring a GT ROI, on the training image, corresponding to the object and a process of creating a second pooled feature map by applying pooling operation to an area, on the feature map, corresponding to the GT ROI; (iii) a process of acquiring information on pixel data of a first bounding box by regression when the first pooled feature map and the second pooled feature map are inputted into a first FC layer; (iv) a process of acquiring a first comparative data by a comparison between the information on the pixel data of the first bounding box and information on pixel data of a GT bounding box; and (v) a process of backpropagating information on the first comparative data to thereby perform a first adjustment of at least part of the parameters.

In accordance with still yet another aspect of the present invention, there is provided a testing device for acquiring a bounding box for testing of an object for testing on a test image by using a testing device including a convolutional neural network (CNN), including: a communication part, on condition that a learning device including the CNN performs or supports another device to perform (1) a process of acquiring a feature map for training from a training image, (2) (i) (i-1) a process of acquiring one or more proposal ROIs for training, on the training image, corresponding to at least one object for training by using an RPN and (i-2) a process of creating at least one first pooled feature map by applying pooling operation to areas, on the feature map for training, corresponding to the proposal ROIs for training, and (ii) (ii-1) a process of acquiring a GT ROI, on the training image, corresponding to the object for training and (ii-2) a process of creating a second pooled feature map by applying pooling operation to an area, on the feature map for training, corresponding to the GT ROI; (3) (i) (i-1) a process of acquiring information on pixel data of a first bounding box for training by regression when the first pooled feature map and the second pooled feature map are inputted into a first FC layer, (i-2) a process of acquiring a first comparative data by a comparison between the information on the pixel data of the first bounding box for training and information on pixel data of a GT bounding box for training, (i-3) a process of backpropagating information on the first comparative data to thereby perform a first adjustment of at least part of the parameters of the CNN; and (ii) (ii-1) a process of acquiring information on pixel data of a second bounding box for training by the regression when the first pooled feature map is inputted into a second FC layer, (ii-2) a process of acquiring a second comparative data by a comparison between the information on the pixel data of the second bounding box for training and the information on the pixel data of the GT bounding box for training, and (ii-3) a process of backpropagating information on the second comparative data to thereby perform a second adjustment of at least part of the parameters of the CNN, for acquiring or supporting another device to acquire the test image or its corresponding at least one feature map for testing; and a processor for (i) acquiring or supporting another device to acquire one or more proposal ROIs for testing, corresponding to the object for testing, on the test image by using the RPN; (ii) creating or supporting another device to create at least one pooled feature map for testing by applying pooling operation to areas, on the feature map for testing acquired from the communication part or the feature map calculated by using the CNN with the parameters having been adjusted by the learning device performing the first and the second adjustments to the test image acquired from the communication part, corresponding to the proposal ROIs for testing; and (iii) acquiring or supporting another device to acquire a bounding box for testing by regression when the pooled feature map for testing is inputted into the second FC layer.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 2:
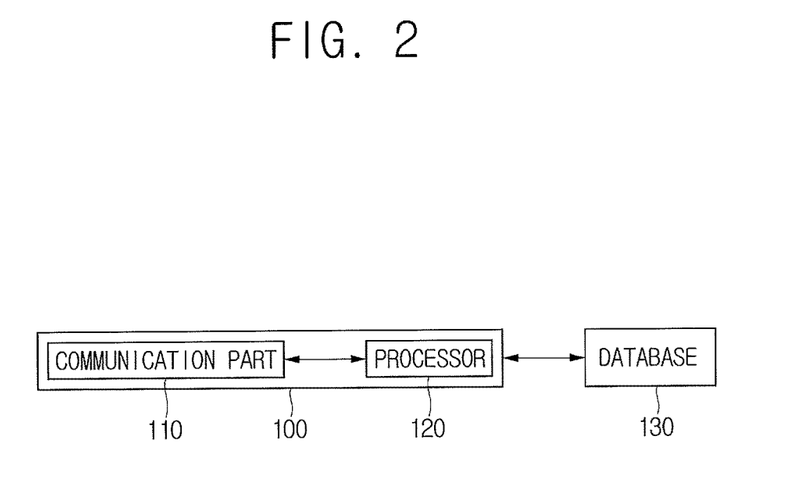
FIG. 2 is a block diagram schematically illustrating a learning device in accordance with one example embodiment of the present invention.

FIG. 2 is a block diagram schematically illustrating a learning device 100 in accordance with one example embodiment of the present invention.

As illustrated in FIG. 2, the learning device 100 of the present invention may include a communication part 110 and a processor 120, and may include a database 130 unlike FIG. 2 as the case may be.

Herein, the learning device 100 of the present invention may be a digital device with a processor capable of computation in accordance with the present invention.

The communication part 110 may be configured to acquire a training image or at least one feature map therefrom.

The processor 120 of the learning device 100 may perform processes of (i) predicting a bounding box on the training image, (ii) acquiring a comparative data by comparing the predicted bounding box with a GT bounding box, and (iii) adjusting parameters of a CNN by backpropagating information on the acquired comparative data. This will be described in sufficient detail later.

The database 130 may be accessible by the communication part 110 of the learning device 100, and may store information on the comparative data, information on class representing whether an object is a vehicle, a pedestrian, or etc., information on ROIs, and information on the parameters.

Figure 3A:
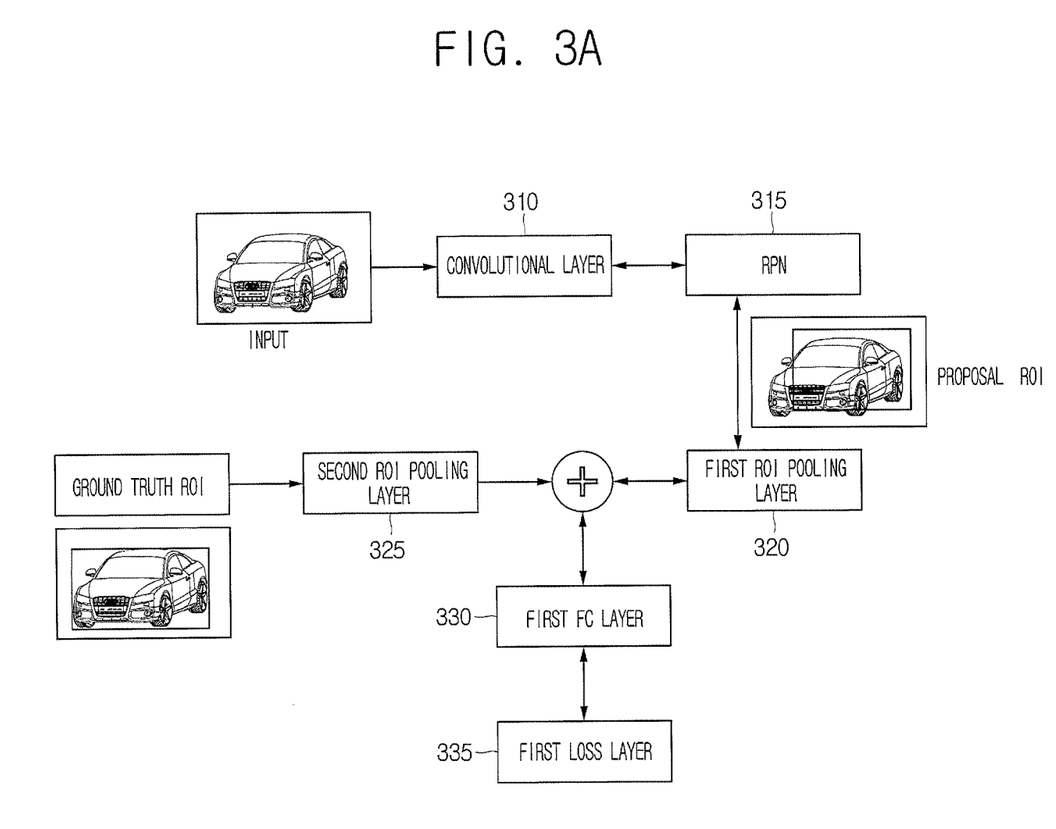
FIG. 3A is a diagram schematically illustrating a process of adjusting parameters using a GT ROI by the learning device including a first FC layer and a first loss layer, in accordance with one example embodiment of the present invention.

FIG. 3A is a diagram illustrating the learning device 100 performing processes of (i) concatenating (i-1) at least one first pooled feature map acquired by a first ROI pooling layer 320 applying pooling operations to areas, on the feature map, corresponding to one or more proposal ROIs outputted from an RPN 315 and (i-2) at least one second pooled feature map acquired by a second ROI pooling layer 325 applying pooling operation to an area, on the feature map, corresponding to a GT ROI, (ii) acquiring the bounding box by regression if the concatenated feature map is inputted into a first FC layer 330, and (iii) adjusting the parameters of the CNN by backpropagating information on one or more loss values acquired by a first loss layer 335 comparing the bounding box with the GT bounding box, in accordance with one example embodiment of the present invention.

Although the learning device 100 is shown as being configured as one device according to the drawings in this specification, the learning device may be divided into several devices to perform its functions. For convenience, the specification of the present invention assumes the learning device is a single device.

By referring to FIG. 3A, the learning device 100 of the present invention may include at least part of a convolutional layer 310 including at least one convolutional filter, the RPN (region proposal network) 315, the first FC layer 330, and the first loss layer 335.

If the training image is acquired through the communication part 110, the processor 120 may allow the convolutional layer 310 to produce the feature map by applying convolution operation to the training image. As the case may be, the communication part 110 may directly acquire a feature map created in advance by another convolutional layer included in another learning device through the communication part 110.

For reference, the convolutional layer 310 may be configured as including one or more convolutional filters, and whenever the training image passes through each convolutional filter, a size of the training image or sizes of its corresponding feature maps may be reduced to a half whereas number of channels of the feature maps may be increased twice.

For example, if a size of the training image is 640×480 and the number of channels thereof is 3, a size of a first feature map is 320×240 and the number of channels thereof is 6, and a size of a second feature map is 160×120 while the number of channels thereof is 12 and so on.

For reference, respective amounts of increase and decrease may differ according to the parameters of each of the convolutional filters included in the conventional layer.

The processor 120 may acquire the proposal ROIs, corresponding to the object, on the training image which are outputted from the RPN 315.

If the proposal ROIs are acquired, the processor 120 may allow the first ROI pooling layer 320 to produce at least one first pooled feature map by applying pooling operation to areas, on the feature map, corresponding to the proposal ROIs. Herein, the pooling operation may include max pooling operation, average pooling operation, or any other operation.

On the other hand, the processor 120 may acquire the GT ROI, on the training image, corresponding to the object and then create at least one second pooled feature map by allowing the second ROI pooling layer 325 to apply pooling operation to an area, on the feature map, corresponding to the GT ROI. Herein, the GT ROI may be an area identical to the GT bounding box which is selected to include the object exactly on the training image by a human.

For reference, the specification regards the ROIs as existing on the training image for convenience, however, it may indicate areas on the feature map, as the case may be.

Further, the processor 120 may perform processes of (i) acquiring information on pixel data of a first bounding box by regression if the first pooled feature map and the second pooled feature map are inputted into the first FC layer 330, (ii) acquiring a first comparative data by the first loss layer 335 comparing the information on the pixel data of the first bounding box with information on pixel data of the GT bounding box and then backpropagating information on the first comparative data.

The data inputted into the first FC layer may include at least one feature vector resulting from the concatenation of the first pooled feature map and the second pooled feature map. This will be explained by referring to FIG. 4.

Figure 4:
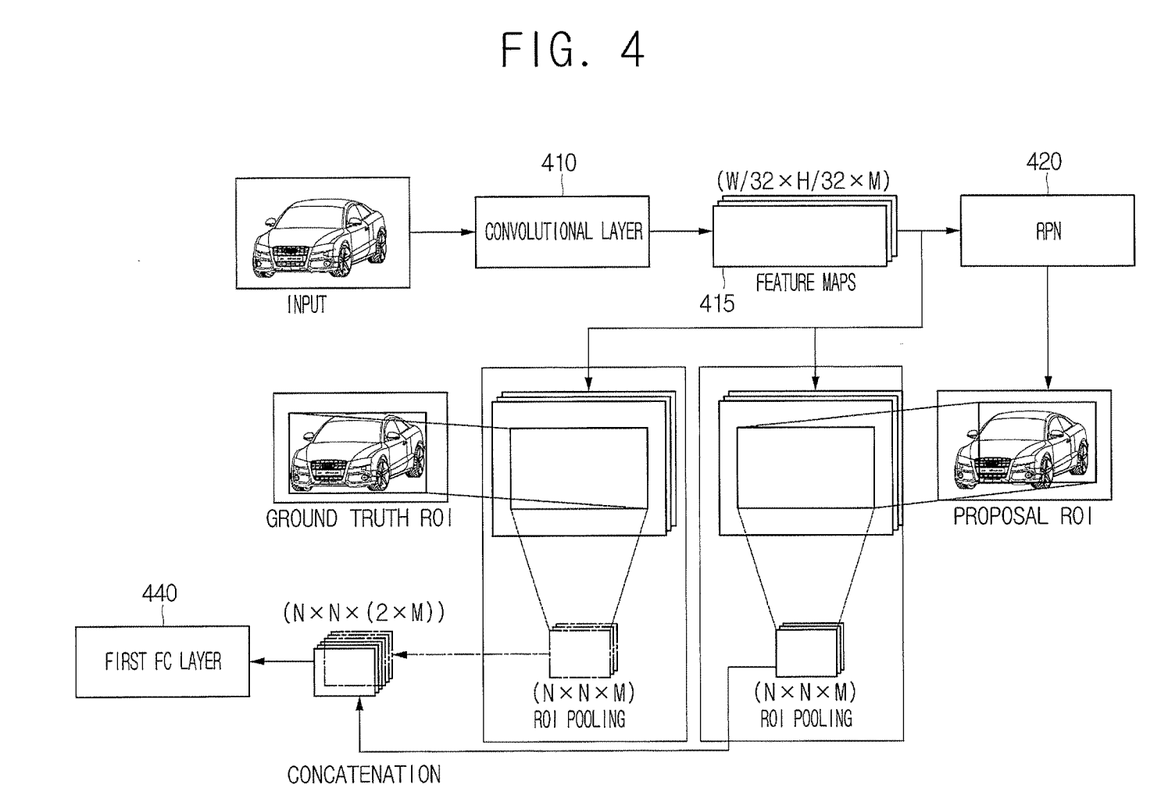
FIG. 4 is a diagram exemplarily illustrating processes of pooling and concatenating the GT ROI and a proposal ROI acquired from an RPN in accordance with one example embodiment of the present invention.

FIG. 4 is a diagram exemplarily illustrating processes of pooling respective areas, on the feature map, corresponding to the GT ROI and the proposal ROIs outputted from the RPN, and concatenating the respective pooled feature maps, in accordance with one example embodiment of the present invention.

For reference, the processes from the step of acquiring the training image to the step of inputting the pooled feature maps into the first FC layer 440, in FIG. 4, are same as the processes from the step of acquiring the training image to the step of inputting the pooled feature maps into the first FC layer 330, in FIG. 3A, therefore, detailed explanation is omitted.

On the other hand, assume that a feature map (w/32×h/32) with M channels is acquired after the training image is passed through the convolutional layer, then the first pooled feature map and the second pooled feature map acquired by applying pooling operation to the feature map (w/32×h/32) with M channels may also have M channels respectively. Herein, the pooled feature map may be a square matrix of N by N dimension and may be called as a feature vector.

The processor 120 may perform processes of (i) acquiring at least one feature vector of N×N×(2×M) dimension by concatenating the first pooled feature map with M channels and the second pooled feature map with M channels along the axis of the channels, and (ii) acquiring the information on the pixel data of the first bounding box by inputting the acquired feature vector into the first FC layer 440. Herein, the information on the pixel data of the first bounding box may include coordinates of the pixels.

Further, the processor 120 may allow the first loss layer 335 in FIG. 3A to produce the first comparative data resulting from a comparison between pixel coordinates of the first bounding box and those of the GT bounding box. Herein, the pixel coordinates may be coordinates of points for each of the bounding boxes, including coordinates of centers and vertices, etc.

Further, the processor 120 may perform a first adjustment of one or more parameters of the CNN by backpropagating information on the first comparative data. The backpropagating may be performed to reduce values of the first comparative data which includes the loss values. The parameters may be of at least one of the first FC layer, the RPN, and the convolutional layer.

The processor 120 may perform or support another device to perform the first adjustments of the parameters as mentioned above by using multiple training images.

Figure 3B:
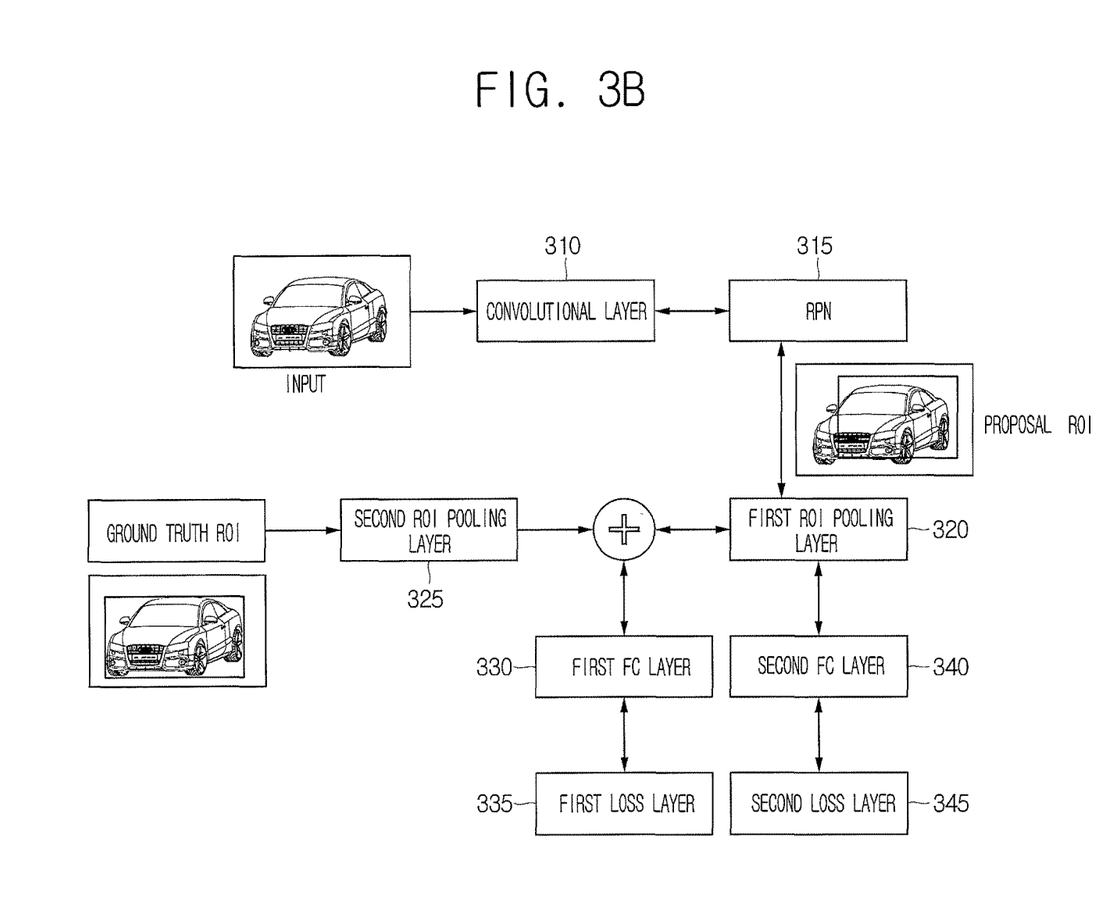
FIG. 3B is a diagram schematically illustrating a process of adjusting the parameters using the GT ROI by the learning device including the first FC layer, a second FC layer, the first loss layer, and a second loss layer in accordance with another example embodiment of the present invention.

FIG. 3B is a diagram illustrating the learning device 100, including the first FC layer 330 and the second FC layer 340, performing processes of (i) acquiring the first comparative data by the first loss layer 335 comparing the information on the pixel data of the first bounding box with the information on the pixel data of the GT bounding box, (ii) acquiring the second comparative data by a second loss layer 345 comparing information on pixel data of a second bounding box with the information on the pixel data of the GT bounding box, and (iii) adjusting the parameters by backpropagating information on the first comparative data and the second comparative data, in accordance with another example embodiment of the present invention.

As shown above, the processes illustrated in FIG. 3B include the processes shown in FIG. 3A, and further include additional processes of the second FC layer 340 and a step of utilizing the second loss layer 345.

The learning device 100 may perform processes of (i) acquiring the information on the pixel data of the second bounding box by the regression when the first pooled feature map is inputted into the second FC layer 340, (ii) acquiring the second comparative data by the second loss layer 345 comparing the information on the pixel data of the second bounding box with the information on the pixel data of the GT bounding box, and (iii) supporting a second adjustment of at least one of the parameters of the CNN by backpropagating information on the second comparative data.

The processor 120 may perform or support another device to perform the second adjustments of the parameters as mentioned above by using multiple training images.

That is, the second adjustment of the parameters may be performed by allowing the second loss layer 345 to produce the second comparative data by a comparison between the information on the pixel data of the GT bounding box and an output of the second FC layer 340 where only the first pooled feature map is inputted. Herein, the parameters may be of at least one of the convolutional layer, the RPN, and the second FC layer.

Therefore, the first adjustment may include adjustment of at least one of the parameters of the convolutional layer, the RPN, and the first FC layer, and the second adjustment may include adjustment of at least one of the parameters of the convolutional layer, the RPN, and the second FC layer.

Further, the processor 120 may compare the pixel coordinates of the first bounding box with the pixel coordinates of the GT bounding box.

Herein, the pixel coordinates may be coordinates of points for each of the bounding boxes as aforementioned. For example, assume that coordinates of the center of the first bounding box are x and y, its width and height are w and h, coordinates of the center of the GT bounding box are x' and y', and its width and height are w' and h', then the first comparative data may be x'−x, y'−y, w'−w, and h'−h. The similar rationale applies to the case of the second comparative data.

On the other hand, the RPN may acquire one or more anchor boxes and set some anchor boxes, selected among the anchor boxes by referring to scores equal to or greater than a predetermined value, as the proposal ROIs where the scores are acquired by comparisons between information on pixel data of each of the anchor boxes and the information on the pixel data of the GT bounding box.

In general, a single pixel may function as anchors of several anchor boxes, therefore, the training image with multiple pixels obviously exhibit multiple anchor boxes. Herein, areas, on the feature map, corresponding to the multiple anchor boxes may be candidates that are subject to pooling operation.

For reference, areas on the feature map which conform to the proposal ROIs may correspond to areas acquired by resizing widths and heights of part of the anchor boxes on the training image. This is because the feature map is acquired from resizing a width and a height of the training image through the convolutional layer, as aforementioned. Similarly, the area on the feature map, which corresponds to the GT ROI, i.e., the GT bounding box, may correspond to an area acquired by resizing a width and a height of the GT bounding box.

On the other hand, respective comparisons may be performed by using a ratio acquired by dividing an area corresponding to intersection of one of the anchor boxes and the GT bounding box by an area corresponding to union of said one of the anchor boxes and the GT bounding box, which is calculated for each of the anchor boxes. Herein, every ratio may function as a score.

For example, if the ratio of a first anchor box and the GT bounding box is three quarters, and the ratio of a second anchor box and the GT bounding box is one third, then the score of the first anchor box may be determined to be greater than that of the second anchor box.

Further, scores may be calculated utilizing various data, e.g., a distance between a center of the anchor box and that of the GT bounding box, a difference or a ratio of a height of the anchor box and that of GT bounding box, a difference or a ratio of a width of the anchor box and that of the GT bounding box, and a distance between an arbitrary point of the anchor box and that of the GT bounding box.

For example, the RPN may determine the anchor boxes with scores equal to or greater than 0.7 as candidates for the proposal ROIs.

Figure 5:
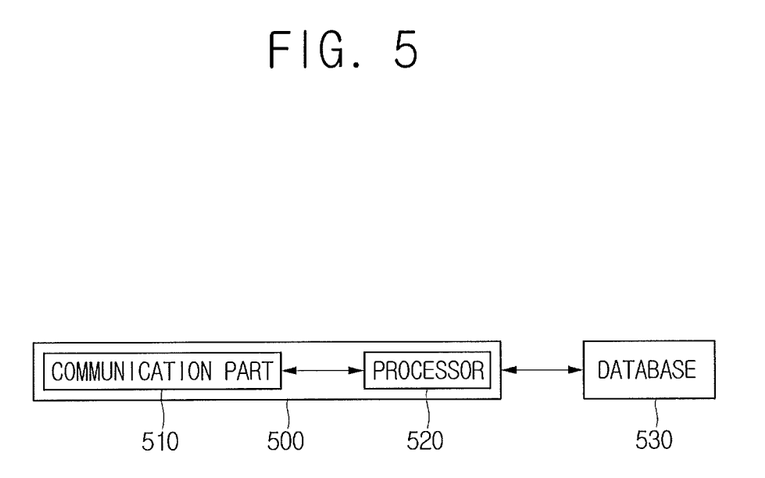
FIG. 5 is a block diagram of a testing device in accordance with one example embodiment of the present invention.

FIG. 5 is a block diagram of a testing device 500 in accordance with one example embodiment of the present invention. Herein, an adjective phrase "for training" describes a conception used in explanation of the learning device 100, and is used in contrast to "for testing" which is used in explanation of the testing device 500 as below. The adjective phrase "for training" was omitted in the above explanation only for convenience.

As illustrated in FIG. 5, the testing device 500 of the present invention may include a communication part 510 and a processor 520, and may include a database 530 unlike FIG. 5 as the case may be. In the figures, the testing device 500 and the learning device 100 are shown as separate devices, however, they may be an identical device.

For reference, upon completing (i) the first adjustment which is adjustment of the parameters of at least one of the convolutional layer, the RPN, and the first FC layer and/or (ii) the second adjustment which is adjustment of the parameters of at least one of the convolutional layer, the RPN, and the second FC layer, the processor 520 of the testing device 500 may perform processes of acquiring the test image and finding at least one bounding box for testing including at least one object for testing.

Figure 6A:
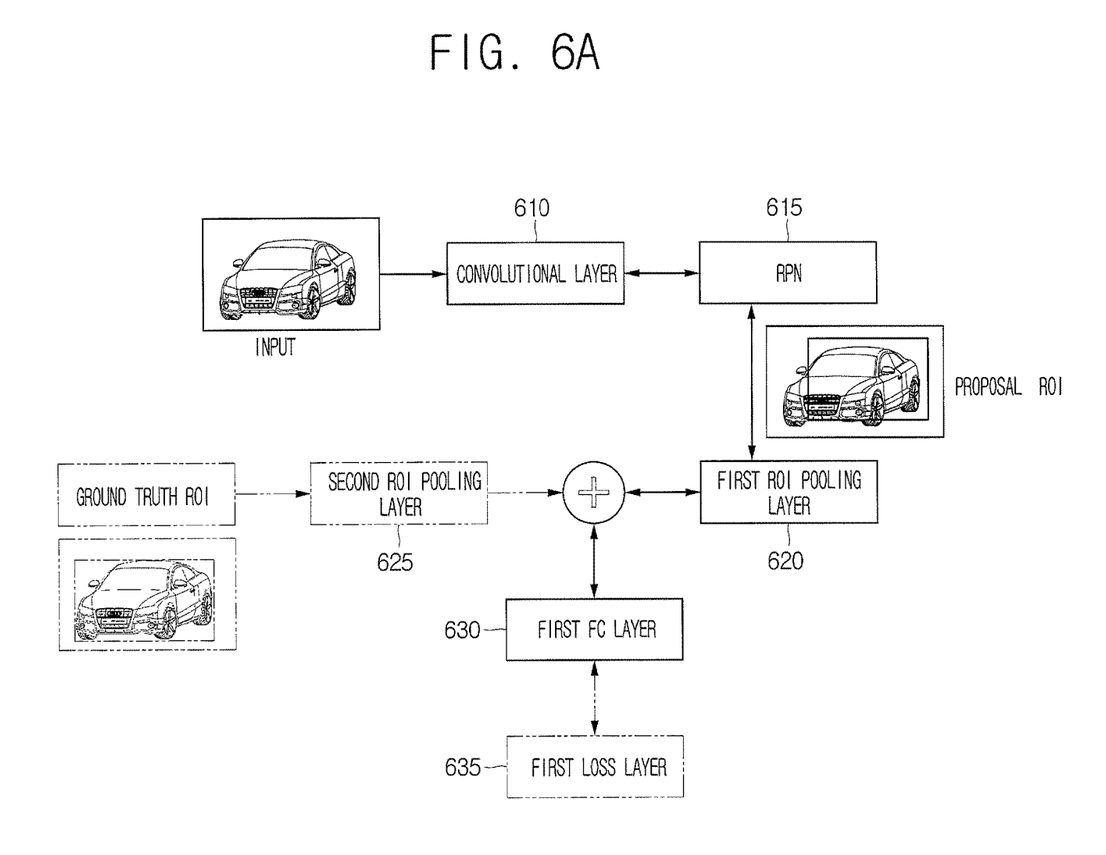
FIG. 6A is a diagram schematically illustrating a process of acquiring a bounding box using adjusted parameters by the testing device including the first FC layer in accordance with one example embodiment of the present invention.

FIG. 6A is a diagram schematically illustrating a process of acquiring the bounding box for testing using the adjusted parameters, by the testing device 500 including the first FC layer 630 in accordance with one example embodiment of the present invention.

For reference, FIG. 6A is a diagram schematically illustrating processes of the testing device 500 including the CNN with parameters acquired by the first adjustment through the learning device 100, and all of the processes are similar to the processes in FIG. 3A except the processes in dash-double dotted lined rectangles, which include a process of applying pooling operation to an area corresponding to the GT ROI and a process of backpropagating information on the acquired first comparative data.

The testing device 500 including the CNN having the parameters with the first adjustment may receive the test image or a feature map for testing acquired therefrom via the communication part 510. Further, as the case may be, information on one or more proposal ROIs for testing outputted from the RPN may be received.

If the test image is acquired via the communication part 510, the processor 520 may input the test image into the convolutional layer 610 to acquire the feature map for testing.

Further, the processor 520 may perform processes of (i) acquiring the proposal ROIs for testing, on the test image, corresponding to the object for testing by using the RPN 615, and (ii) creating a pooled feature map for testing by an ROI pooling layer 620 applying pooling operation to areas, on the feature map for testing, corresponding to the proposal ROIs for testing.

Next, the processor 520 may input the pooled feature map for testing into the first FC layer 630 to acquire the bounding box for testing by the regression.

Compared to the bounding box acquired by using parameters without the first adjustment, the bounding box for testing may include the object for testing more accurately.

Figure 6B:
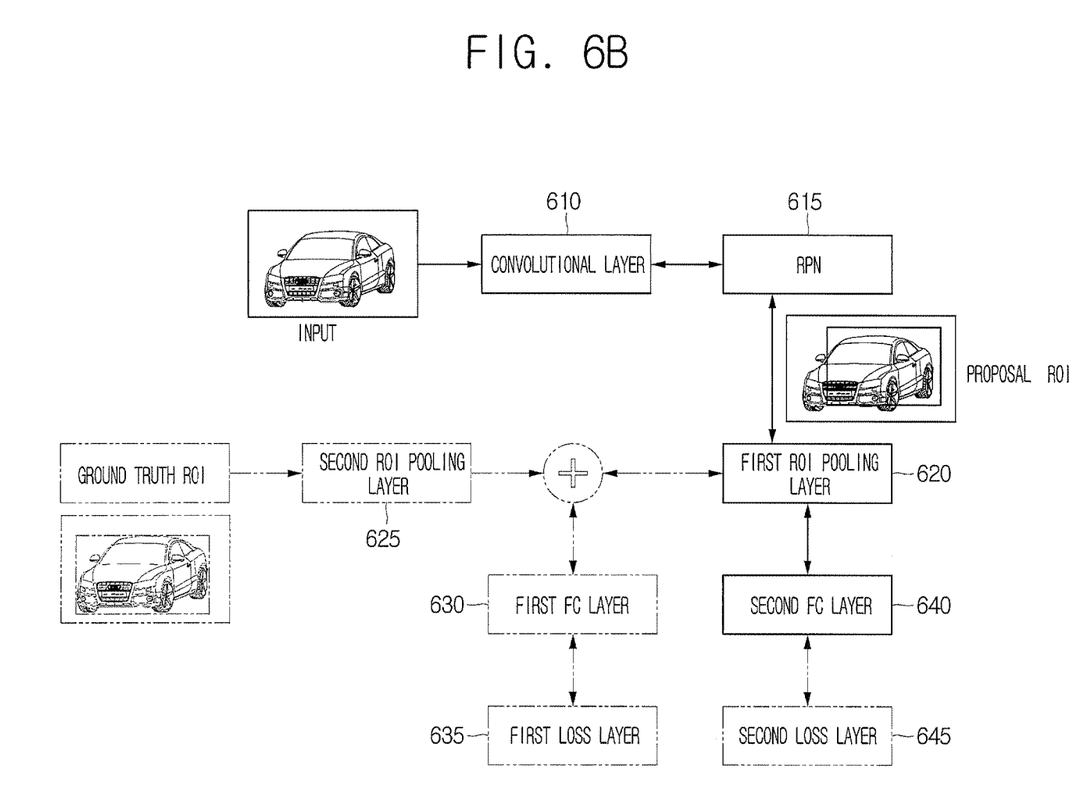
FIG. 6B is a diagram schematically illustrating a process of acquiring the bounding box using the adjusted parameters by the testing device including the second FC layer in accordance with another example embodiment of the present invention.

FIG. 6B is a diagram schematically illustrating a process of acquiring the bounding box for testing by the testing device 500 including the second FC layer 640 in accordance with another example embodiment of the present invention.

For reference, FIG. 6B is a diagram schematically illustrating processes of the testing device 500 including the CNN with the parameters acquired by the first and the second adjustments through the learning device 100, and all of the processes are similar to the processes in FIG. 3B except the processes in double-dash dotted lined rectangles, which include (i) a process of applying pooling operation to an area corresponding to the GT ROI, (ii) a process of backpropagating information on the acquired first and second comparative data, and (iii) a process of acquiring the bounding box for testing by using the first FC layer 630.

For reference, the reason that the process of acquiring the bounding box from the first FC layer 630 is represented in double-dash dotted lines in FIG. 6B is that the first FC layer 630 is used for adjusting the parameters in a training process and that only the second FC layer 640 is used in a testing process.

The testing device 500 including the CNN with the parameters acquired by the first and the second adjustments may receive the test image or the feature map for testing acquired therefrom via the communication part 510.

If the test image is acquired via the communication part 510, the processor 520 may allow the convolutional layer 610 to produce the feature map for testing by applying convolution operation to the test image.

Further, the processor 520 may perform processes of (i) acquiring the proposal ROIs for testing, on the test image, corresponding to the object for testing by using the RPN 615, and (ii) creating the pooled feature map for testing by the ROI pooling layer 620 applying pooling operation to areas, on the feature map for testing, corresponding to the proposal ROIs for testing.

Next, the processor 520 may input the pooled feature map for testing into the second FC layer 640 to thereby acquire the bounding box for testing by the regression.

Compared to the bounding box acquired by using the parameters without the first and the second adjustments, the bounding box for testing may include the object for testing more accurately.

The present invention has an effect of (i) concatenating (i-1) a pooled feature map acquired by applying pooling operation to areas, on the feature map, corresponding to the ROIs acquired using the RPN and (i-2) a pooled feature map acquired by applying pooling operation to an area, on the feature map, corresponding to the GT ROI, (ii) inputting the concatenated pooled feature map into an FC layer to acquire the bounding box by the regression, (iii) backpropagating information on the loss values acquired by a comparison between the acquired bounding box and the GT bounding box to thereby adjust the parameters, and (iv) supporting another device to acquire the bounding box for testing, on the test image, including the object for testing more accurately by using the adjusted parameters.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A learning method for adjusting one or more parameters of a convolutional neural network (CNN) by using loss augmentation, the method applied in a visual imaging system that adaptively adjusts bounding boxes of detected objects captured by the visual imaging system, the method comprising steps of:
   (a) a learning device, comprising a processor, acquiring or supporting another device to acquire at least one feature map from a training image;
   (b) the learning device performing or supporting another device to perform (i) a process of acquiring one or more proposal regions of interest ("ROIs") corresponding to at least one object on the training image by using a region proposal network ("RPN") and a process of creating at least one first pooled feature map by applying pooling operation to areas, on the feature map, corresponding to the proposal ROIs, and (ii) a process of acquiring a ground truth ("GT") ROI, on the training image, corresponding to the object and a process of creating a second pooled feature map by applying pooling operation to an area, on the feature map, corresponding to the GT ROI, the second pooled feature map including additional features of the object that were not captured in the at least one first pooled feature map;
   (c) the learning device performing or supporting another device to perform (i) a process of acquiring information on pixel data of a first bounding box by regression when the at least one first pooled feature map and the second pooled feature map are inputted into a first fully connected ("FC") layer, (ii) a process of acquiring a first comparative data by a comparison between the information on the pixel data of the first bounding box and information on pixel data of a GT bounding box, and (iii) a process of backpropagating information on the first comparative data to thereby perform a first adjustment of at least part of the parameters of the CNN to reduce values of the first comparative data which includes loss data; and (d) the learning device storing the parameters, as adjusted, in a storage for application in setting a new bounding box around a subsequent object detected by the imaging system.

2. The method of claim 1, wherein, at the step of (c), the learning device performs or supports another device to perform (i) a process of acquiring information on pixel data of a second bounding box by the regression when the first pooled feature map is inputted into a second fully connected layer, (ii) a process of acquiring a second comparative data by a comparison between the information on the pixel data of the second bounding box and the information on the pixel data of the GT bounding box, and (iii) a process of backpropagating information on the second comparative data to thereby perform a second adjustment of at least part of the parameters.

3. The method of claim 2, wherein the first adjustment of the parameters includes adjustment of the parameters of at least one of a convolutional layer, the RPN, and the first fully connected layer, and the second adjustment of the parameters includes adjustment of the parameters of at least one of the convolutional layer, the RPN, and the second fully connected layer.

4. The method of claim 1, wherein, at the step of (c), the learning device performs or supports another device to perform (i) a process of acquiring at least one feature vector by concatenating the first pooled feature map and the second pooled feature map, (ii) a process of acquiring the information on the pixel data of the first bounding box by the regression when the feature vector is inputted into the first fully connected layer, (iii) a process of acquiring the first comparative data by a comparison between the information on the pixel data of the first bounding box and the information on the pixel data of the GT bounding box, and (iv) a process of backpropagating the information on the first comparative data to thereby perform the first adjustment of at least part of the parameters.

5. The method of claim 1, wherein, at the step of (c), the learning device acquires or supports another device to acquire the information on the pixel data of the first bounding box by the regression when the first pooled feature map and the second pooled feature map are inputted into the first fully connected layer, and then the learning device compares or supports another device to compare pixel coordinates of the first bounding box and pixel coordinates of the GT bounding box.

6. The method of claim 1, wherein the learning device allows the RPN to acquire or support another device to acquire one or more anchor boxes, on the training image, whose scores are equal to or greater than a first threshold, as the proposal ROIs, wherein the scores are acquired by respective comparisons between information on pixel data of the respective anchor boxes and the information on the pixel data of the GT bounding box.

7. The method of claim 6, wherein the respective comparisons are performed by using a ratio acquired by dividing an area corresponding to intersection of one of the anchor boxes and the GT bounding box by an area corresponding to union of said one of the anchor boxes and the GT bounding box, wherein the ratio is calculated for each of the anchor boxes.

8. A method of acquiring a bounding box for testing of an object for testing on a test image by using a testing device including a convolutional neural network (CNN), the method applied in a visual imaging system that adaptively adjusts the bounding box about the object that is captured by the visual imaging system, the method comprising steps of:

(a) the testing device, on condition that a learning device, comprising a processor, including the CNN performs or supports another device to perform (1) a process of acquiring a feature map for training from a training image, (2) (i) (i-1) a process of acquiring one or more proposal regions of interest ("ROIs") for training, on the training image, corresponding to at least one object for training by using a region proposal network ("RPN") and (i-2) a process of creating at least one first pooled feature map by applying pooling operation to areas, on the feature map for training, corresponding to the proposal ROIs for training, and (ii) (ii-1) a process of acquiring a ground truth ("GT") ROI, on the training image, corresponding to the object for training and (ii-2) a process of creating a second pooled feature map by applying pooling operation to an area, on the feature map for training, corresponding to the GT ROI, the second pooled feature map including additional features of the object that were not captured in the at least one first pooled feature map; (3) (i) (i-1) a process of acquiring information on pixel data of a first bounding box for training by regression when the first pooled feature map and the second pooled feature map are inputted into a first fully connected ("FC") layer, (i-2) a process of acquiring a first comparative data by a comparison between the information on the pixel data of the first bounding box for training and information on pixel data of a GT bounding box for training, (i-3) a process of backpropagating information on the first comparative data to thereby perform a first adjustment of at least part of the parameters of the CNN to reduce values of the first comparative data which includes loss data; and (ii) (ii-1) a process of acquiring information on pixel data of a second bounding box for training by the regression when the first pooled feature map is inputted into a second FC layer, (ii-2) a process of acquiring a second comparative data by a comparison between the information on the pixel data of the second bounding box for training and the information on the pixel data of the GT bounding box for training, and (ii-3) a process of backpropagating information on the second comparative data to thereby perform a second adjustment of at least part of the parameters of the CNN, acquiring or supporting another device to acquire the test image and then a feature map for testing therefrom by using the CNN with the parameters having been adjusted by the learning device performing the first and the second adjustments; and (4) a process of storing the parameters, as adjusted, in a storage for application in setting a new bounding box around a subsequent object detected by the imaging system;

(b) the testing device acquiring or supporting another device to acquire one or more proposal ROIs for testing, corresponding to the object for testing, on the test image by using the RPN;

(c) the testing device creating or supporting another device to create at least one pooled feature map for testing by applying pooling operation to areas, on the feature map for testing, corresponding to the proposal ROIs for testing; and (d) the testing device acquiring or supporting another device to acquire a bounding box for testing by regression when the pooled feature map for testing is inputted into the second FC layer.

9. The method of claim 8, wherein the first adjustment of the parameters includes adjustment of the parameters of at least one of a convolutional layer, the RPN, and the first FC layer, and the second adjustment of the parameters includes adjustment of the parameters of at least one of the convolutional layer, the RPN, and the second FC layer.

10. The method of claim 8, wherein the learning device performs or supports another device to perform (i) a process of acquiring at least one feature vector by concatenating the first pooled feature map and the second pooled feature map, (ii) a process of acquiring information on pixel data of the first bounding box for training by the regression when the feature vector is inputted into the first FC layer, (iii) a process of acquiring the first comparative data by a comparison between the information on the pixel data of the first bounding box and information on pixel data of the GT bounding box for training, and (iv) a process of backpropagating information on the first comparative data to thereby perform the first adjustment of at least part of the parameters of the CNN.

11. The method of claim 8, wherein the learning device compares or supports another device to compare pixel coordinates of the first bounding box for training and pixel coordinates of the GT bounding box for training if information on the pixel coordinates of the first bounding box for training is acquired by the regression when the first pooled feature map and the second pooled feature map are inputted into the first FC layer.

12. The method of claim 8, wherein the learning device allows the RPN to acquire or support another device to acquire one or more anchor boxes, on the training image, whose scores are equal to or greater than a second threshold, as the proposal ROIs for training, wherein the scores are acquired by respective comparisons between information on pixel data of the respective anchor boxes and the information on the pixel data of the GT bounding box for training.

13. A learning device for adjusting one or more parameters of a convolutional neural network (CNN) by using loss augmentation, the learning device applied in a visual imaging system that adaptively adjusts bounding boxes around detected objects captured by the visual imaging system, comprising:
a communication part for acquiring or supporting another device to acquire a training image or its corresponding at least one feature map; and
a processor configured to perform or support another device to perform (i) a process of acquiring one or more proposal regions of interest ("ROIs") corresponding to at least one object on the training image by using a region proposal network ("RPN") and a process of creating at least one first pooled feature map by applying pooling operation to areas, on the feature map acquired from the communication part or the feature map calculated by applying one or more convolution operations to the training image acquired from the communication part, corresponding to the proposal ROIs; (ii) a process of acquiring a ground truth ("GT") ROI, on the training image, corresponding to the object and a process of creating a second pooled feature map by applying pooling operation to an area, on the feature map, corresponding to the GT ROI, the second pooled feature map including additional features of the object that were not captured in the at least one first pooled feature map; (iii) a process of acquiring information on pixel data of a first bounding box by regression when the first pooled feature map and the second pooled feature map are inputted into a first fully connected ("FC") layer; (iv) a process of acquiring a first comparative data by a comparison between the information on the pixel data of the first bounding box and information on pixel data of a GT bounding box; (v) a process of backpropagating information on the first comparative data to thereby perform a first adjustment of at least part of the parameters of the CNN to reduce values of the first comparative data which includes loss data, and (vi) a process of storing the parameters, as adjusted, in a storage for application in setting a new bounding box around a subsequent object detected by the imaging system.

14. The learning device of claim 13, wherein, after the process of (ii), the processor further performs or supports another device to perform (a) a process of acquiring information on pixel data of a second bounding box by the regression when the first pooled feature map is inputted into a second fully connected layer, (b) a process of acquiring a second comparative data by a comparison between the information on the pixel data of the second bounding box and the information on the pixel data of the GT bounding box, and (c) a process of backpropagating information on the second comparative data to thereby perform a second adjustment of at least part of the parameters.

15. The learning device of claim 14, wherein the first adjustment of the parameters includes adjustment of the parameters of at least one of a convolutional layer, the RPN, and the first fully connected layer, and the second adjustment of the parameters includes adjustment of the parameters of at least one of the convolutional layer, the RPN, and the second fully connected layer.

16. The learning device of claim 13, wherein, at the processes from (iii) to (v), the processor performs or supports another device to perform (a) a process of acquiring at least one feature vector by concatenating the first pooled feature map and the second pooled feature map, (b) a process of acquiring the information on the pixel data of the first bounding box by the regression when the feature vector is inputted into the first fully connected layer, (c) a process of acquiring the first comparative data by a comparison between the information on the pixel data of the first bounding box and the information on the pixel data of the GT bounding box, and (d) a process of backpropagating the information on the first comparative data to thereby perform the first adjustment of at least part of the parameters.

17. The learning device of claim 13, wherein, at the process of (iv), the processor acquires or supports another device to acquire the information on the pixel data of the first bounding box by the regression when the first pooled feature map and the second pooled feature map are inputted into the first fully connected layer, and then the processor compares or supports another device to compare pixel coordinates of the first bounding box and pixel coordinates of the GT bounding box.

18. The learning device of claim 13, wherein the processor allows the RPN to acquire or support another device to acquire one or more anchor boxes, on the training image, whose scores are equal to or greater than a first threshold, as the proposal ROIs, wherein the scores are acquired by respective comparisons between information on pixel data of the respective anchor boxes and the information on the pixel data of the GT bounding box.

19. The learning device of claim 18, wherein the respective comparisons are performed by using a ratio acquired by dividing an area corresponding to intersection of one of the anchor boxes and the GT bounding box by an area corresponding to union of said one of the anchor boxes and the GT bounding box, wherein the ratio is calculated for each of the anchor boxes.

20. A testing device for acquiring a bounding box for testing of an object for testing on a test image by using a testing device including a convolutional neural network (CNN), the testing device applied in a visual imaging system that adaptively adjusts a bounding box around a detected object captured by the visual imaging system, comprising:

a communication part, on condition that a learning device including the CNN performs or supports another device to perform (1) a process of acquiring a feature map for training from a training image, (2) (i) (i-1) a process of acquiring one or more proposal regions of interest ("ROIs") for training, on the training image, corresponding to at least one object for training by using a region proposal network ("RPN") and (i-2) a process of creating at least one first pooled feature map by applying pooling operation to areas, on the feature map for training, corresponding to the proposal ROIs for training, and (ii) (ii-1) a process of acquiring a ground truth ("GT") ROI, on the training image, corresponding to the object for training and (ii-2) a process of creating a second pooled feature map by applying pooling operation to an area, on the feature map for training, corresponding to the GT ROI, the second pooled feature map including additional features of the object that were not captured in the at least one first pooled feature map; (3) (i) (i-1) a process of acquiring information on pixel data of a first bounding box for training by regression when the first pooled feature map and the second pooled feature map are inputted into a first fully connected ("FC") layer, (i-2) a process of acquiring a first comparative data by a comparison between the information on the pixel data of the first bounding box for training and information on pixel data of a GT bounding box for training, (i-3) a process of backpropagating information on the first comparative data to thereby perform a first adjustment of at least part of the parameters of the CNN to reduce values of the first comparative data which includes loss data; and (ii) (ii-1) a process of acquiring information on pixel data of a second bounding box for training by the regression when the first pooled feature map is inputted into a second FC layer, (ii-2) a process of acquiring a second comparative data by a comparison between the information on the pixel data of the second bounding box for training and the information on the pixel data of the GT bounding box for training, (ii-3) a process of backpropagating information on the second comparative data to thereby perform a second adjustment of at least part of the parameters of the CNN, for acquiring or supporting another device to acquire the test image or its corresponding at least one feature map for testing; and (4) a process of storing the parameters, as adjusted, in a storage for application in setting a new bounding box around a subsequent object detected by the imaging system; and a processor for (i) acquiring or supporting another device to acquire one or more proposal ROIs for testing, corresponding to the object for testing, on the test image by using the RPN; (ii) creating or supporting another device to create at least one pooled feature map for testing by applying pooling operation to areas, on the feature map for testing acquired from the communication part or the feature map calculated by using the CNN with the parameters having been adjusted by the learning device performing the first and the second adjustments to the test image acquired from the communication part, corresponding to the proposal ROIs for testing; and (iii) acquiring or supporting another device to acquire a bounding box for testing by regression when the pooled feature map for testing is inputted into the second FC layer.

21. The testing device of claim 20, wherein the first adjustment of the parameters includes adjustment of the parameters of at least one of a convolutional layer, the RPN, and the first FC layer, and the second adjustment of the parameters includes adjustment of the parameters of at least one of the convolutional layer, the RPN, and the second FC layer.

22. The testing device of claim 20, wherein the learning device performs or supports another device to perform (i) a process of acquiring at least one feature vector by concatenating the first pooled feature map and the second pooled feature map, (ii) a process of acquiring information on pixel data of the first bounding box for training by the regression when the feature vector is inputted into the first FC layer, (iii) a process of acquiring the first comparative data by a comparison between the information on the pixel data of the first bounding box and information on pixel data of the GT bounding box for training, and (iv) a process of backpropagating information on the first comparative data to thereby perform the first adjustment of at least part of the parameters of the CNN.

23. The testing device of claim 20, wherein the learning device compares or supports another device to compare pixel coordinates of the first bounding box for training and pixel coordinates of the GT bounding box for training if information on the pixel coordinates of the first bounding box for training is acquired by the regression when the first pooled feature map and the second pooled feature map are inputted into the first FC layer.

24. The testing device of claim 20, wherein the learning device allows the RPN to acquire or support another device to acquire one or more anchor boxes, on the training image, whose scores are equal to or greater than a second threshold, as the proposal ROIs for training, wherein the scores are acquired by respective comparisons between information on pixel data of the respective anchor boxes and the information on the pixel data of the GT bounding box for training.

* * * * *